Oct. 11, 1966 P. J. CLOUZEAU ET AL 3,278,086
CONTAINERS FOR COMPRESSED FLUIDS, AND VALVE
FOR SUCH CONTAINERS
Filed Nov. 29, 1963 6 Sheets-Sheet 3
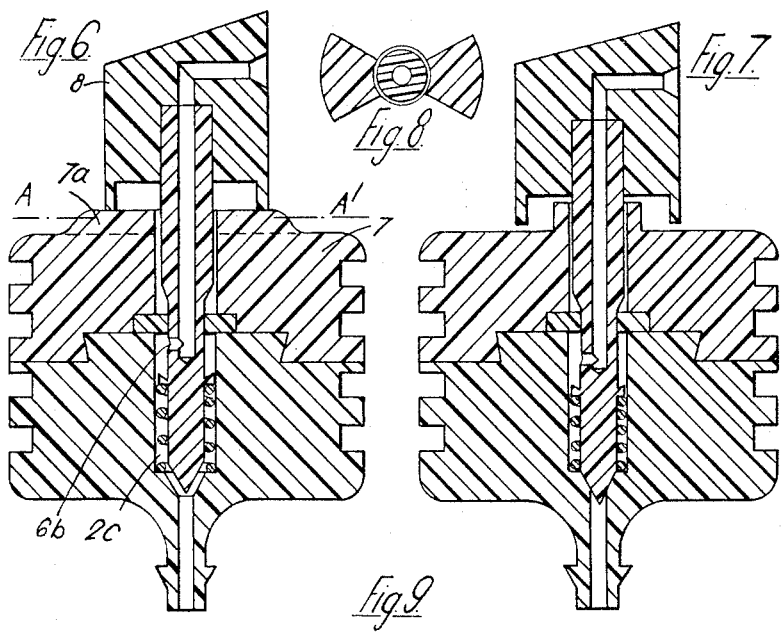
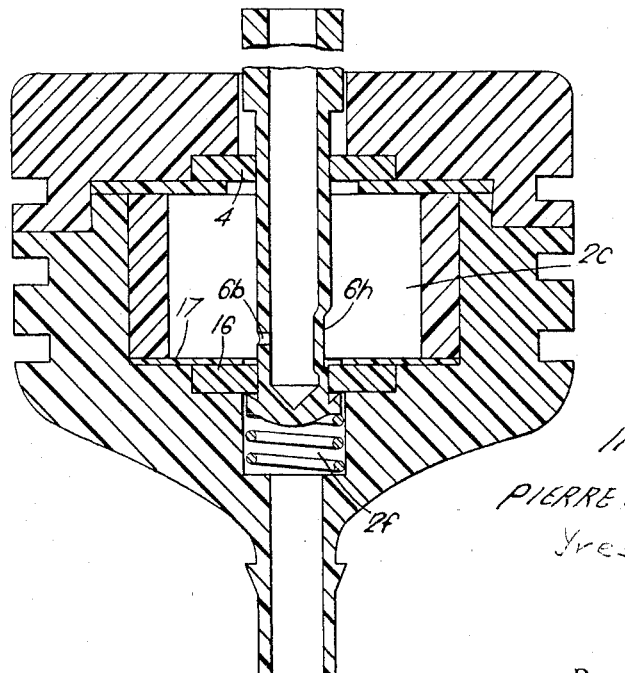
INVENTORS
PIERRE J. CLOUZEAU
Yves Le Troadec
By
Stevens, Davis, Miller & Mosher
Attorneys

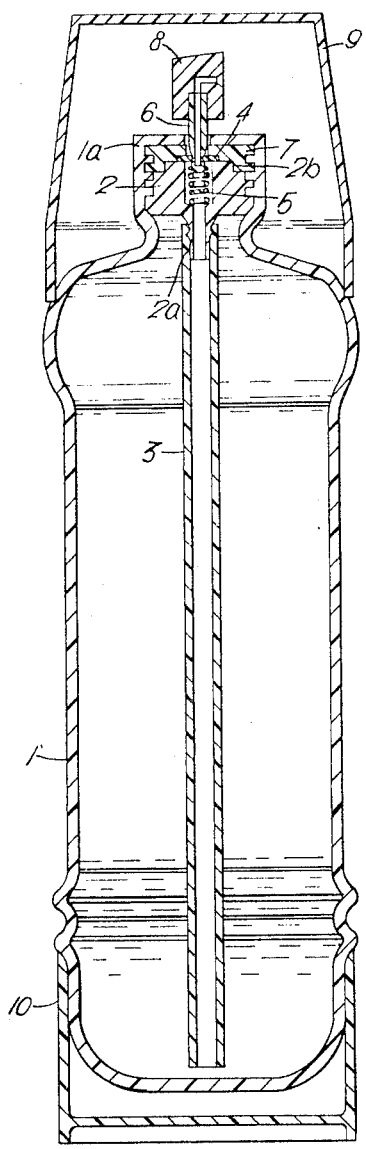

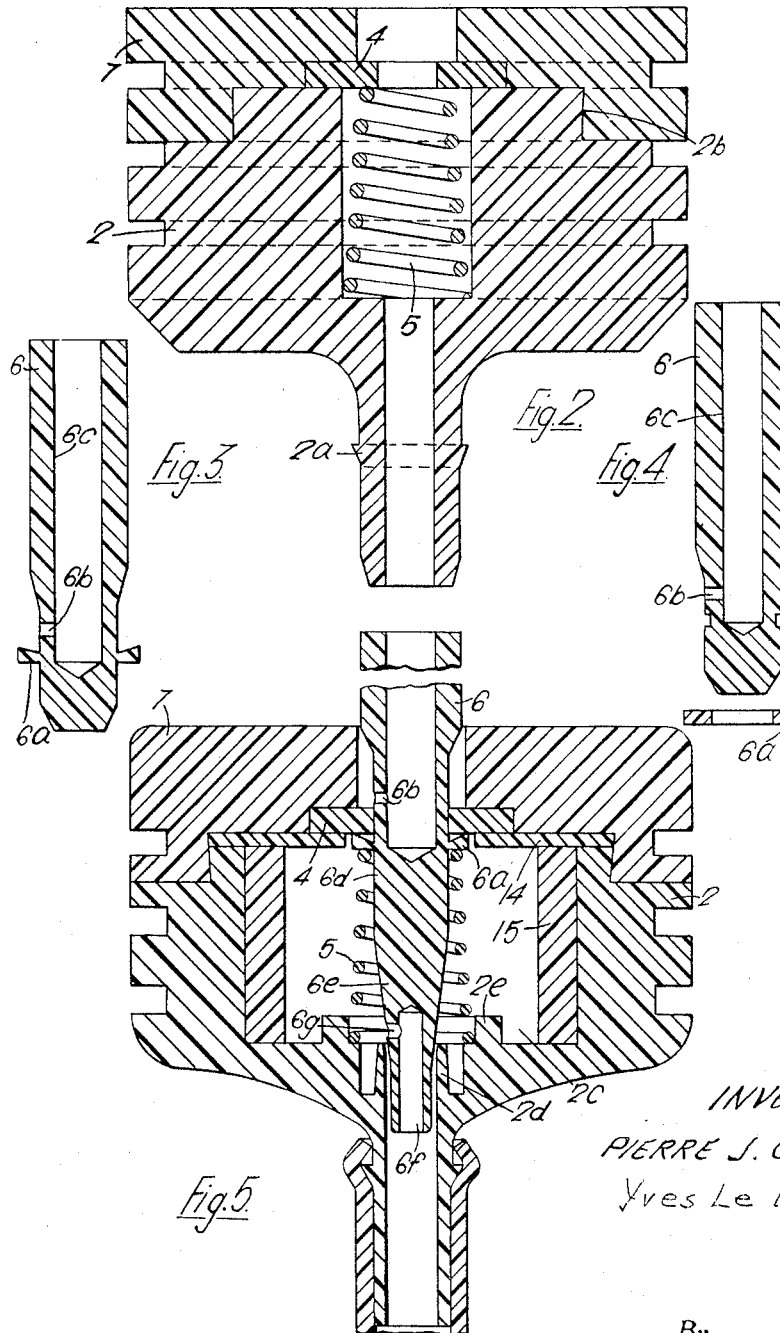

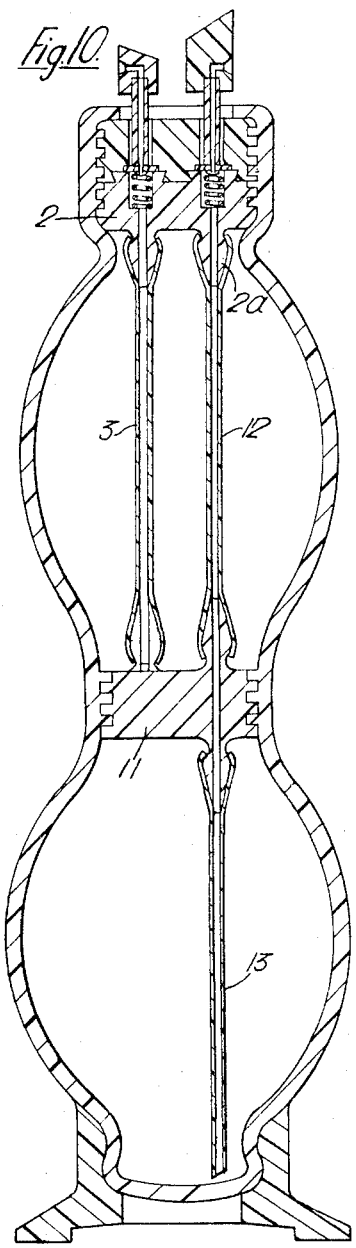

Oct. 11, 1966  P. J. CLOUZEAU ETAL  3,278,086
CONTAINERS FOR COMPRESSED FLUIDS, AND VALVE
FOR SUCH CONTAINERS
Filed Nov. 29, 1963  6 Sheets-Sheet 5
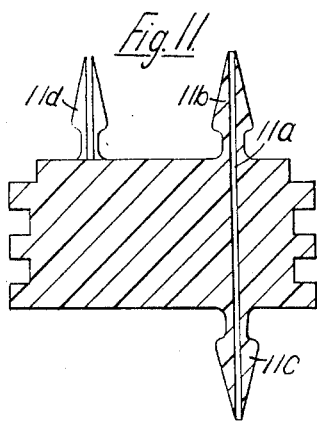
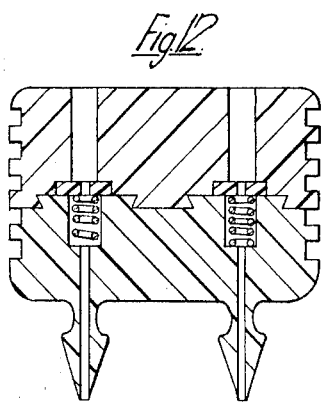
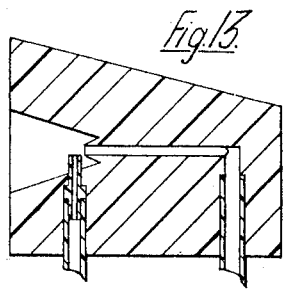
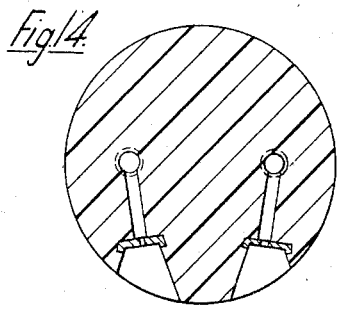
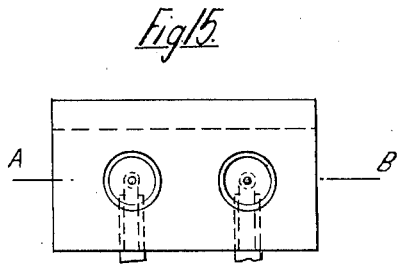
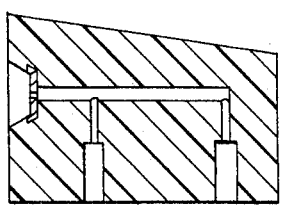
INVENTORS
PIERRE J. CLOUZEAU
Yves Le Troadec
By
Stevens, Davis, Miller & Mosher
Attorneys

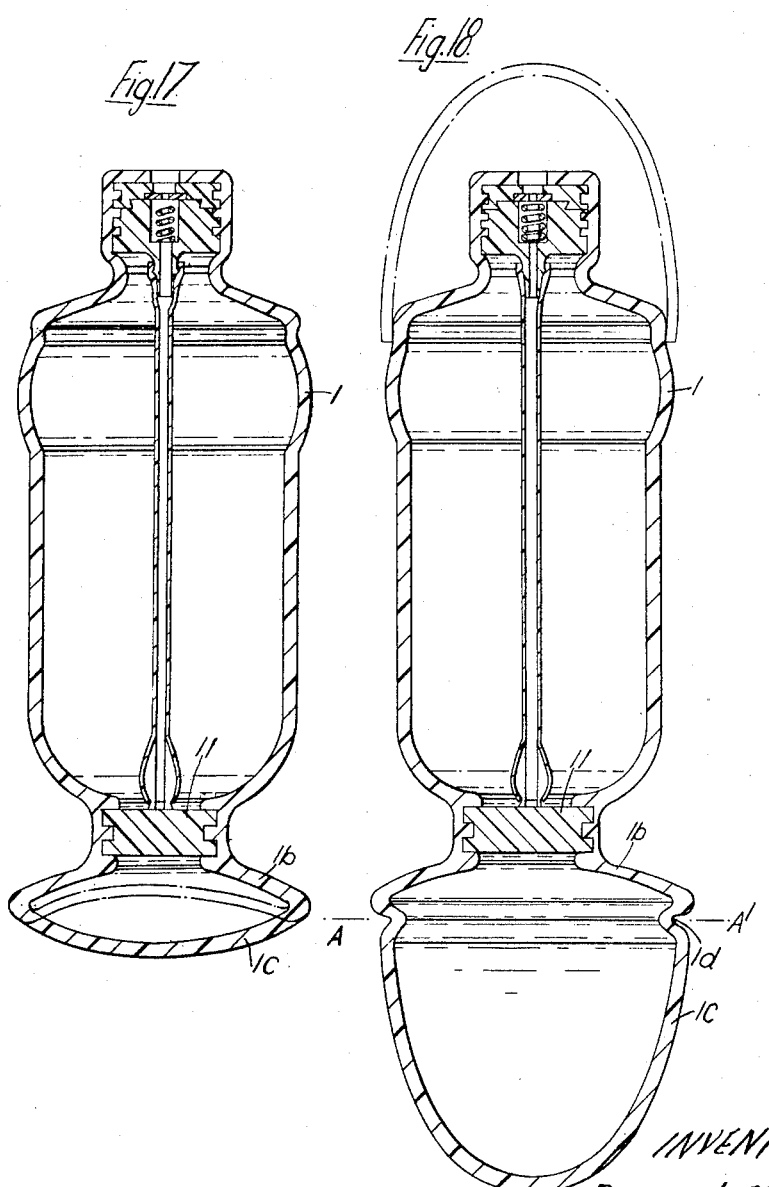

United States Patent Office 3,278,086
Patented Oct. 11, 1966

3,278,086
CONTAINERS FOR COMPRESSED FLUIDS, AND VALVE FOR SUCH CONTAINERS
Pierre J. Clouzeau, Meudon, and Yves Le Troadec, Douai, Nord, France, assignors to Rhone-Poulenc S.A., Paris, France, a French body corporate
Filed Nov. 29, 1963, Ser. No. 327,138
Claims priority, application France, Nov. 29, 1962, 917,039; June 28, 1963, 939,775; Aug. 30, 1963, 946,189; Oct. 30, 1963, 952,312
5 Claims. (Cl. 222—135)

This invention concerns new containers, and in particular atomising flasks formed of organic thermoplastic material for compressed fluid, an improved process permitting their manufacture and new valves for such containers.

There are already known a number of forms of containers in which the distributor valve member is maintained in the neck of the container by a metallic mounting.

More recently there have been proposed containers of plastics material in which the distributor valve is not so mounted but is engaged by the interior of a specially formed neck.

The manufacture of containers of the latter type clearly involve the separate moulding of one half of the containers comprising the neck and the complementary half comprising the base. After insertion of the distributor valve in the neck, the two halves of the containers must be assembled by a fluid-tight and resistant solder.

There have also been proposed containers which are compartmented. Each of the compartments can be provided with an individual distributor or a common distributor for delivering simultaneously the contents of several compartments depending on the use to which the container is to be put. One can thus distribute (a) separately several products of different or complementary uses (such as a treating product and a finishing product); or (b) simultaneously several products which are immiscible or of which the mixture is chemically unstable.

Simultaneous distribution can be realised by a single operating member acting on the independent nozzles (e.g., for the projection of a polymerisable varnish and of its catalyst; or of a fire-extinguishing foam composition), or alternatively by a single nozzle ensuring the mixing of the products e.g., for the distribution of an emulsion or the atomisation of one by the other e.g., for the emission of fumigating mixtures, atomisation of nitric acid or other unstable reactant for the development of chromatograms.

According to the present invention there is provided a container for fluids under pressure such container being formed of thermoplastics material and comprising at least one chamber and one distributor valve allowing the filling of the container through its mechanism, the body of the container being formed as a single piece which encloses in a fixed and sealing tight manner, without the aid of auxiliary members, the body of the distributor valve and any members adapted to form internal partitions to the container.

The type of distributor valve which is used is not critical as long as it permits the filling of the container through its mechanism. Thus one can use a valve such as that described in U.S. Patent No. 2,136,940 applied for on July 2, 1936. Other examples of distributor valves will be given hereinafter.

Another aspect of the invention provides a process for manufacture of these containers wherein a thermoplastic tube is positioned between the shells of a mould so as to surround the body of the preassembled valve, closing the mould, establishing a positive pressure difference between the internal walls and the external walls of the tube, cooling the container, removing the container from the mould.

The method of making the tube is not critical; one may in particular make it by extrusion or injection.

The material of the containers may be a polyamide, polyolefine of high molecular weight, a polyaldehyde, a polycarbonate, this enumeration not however being limitative since any other thermoplastic material of appropriate quality is suitable. The materials may be used in the simple polymeric condition or as copolymers or a mixture of polymers containing reinforcing fillers as desired.

The form of the distributor valve member is not critical, its boundary surface with the neck of the container can take any form compatible with the desired results. More generally one may use a cylindrical form or a form more or less conical; this surface may moreover be provided with ribs, the same applying to any internal partitions.

As has been mentioned above, the valve can be at least partially assembled before the formation of the container; after this operation in effect all disassembly is impossible and only the external elements such as the nozzle or diffuser can be added.

In practice the making of the containers according to this invention comprises the following operations:
 (a) Assembly of the internal elements of the distributor valve and of any internal partitions;
 (b) Fixing of this assembly on a support at the base of an open vertical extrusion mould;
 (c) Formation of a parison in plastic material;
 (d) Putting this in place in the mould, thereby surrounding the distributor valve and any partitions;
 (e) Closing the mould;
 (f) Forming under the action of a pressure differential between the two walls of the mould, by blowing or vacuum formation.

When one uses a blowing operation and the pre-assembled valve member can be fixed directly on the blowing nozzle.

These different operations can naturally be effected in many different ways. Thus the distributor valve member and any partitions, can be heated or not as desired; their boundary with the body of the container can be submitted to any appropriate treatment in order to effect their coalescence and may be provided with a suitable glue in order to increase their adherences.

The blowing can be effected by air pressure according to customary technique or other fluid pressure. In particular one may use the fluid (or one of the fluids) constituting the charge in the container, for example butane or halogenated hydrocarbon such as diachlorodifluoromethane and the analogous of propellents. In the case of extrusion-blowing it may be useful to begin the injection of fluid at the start of the extrusion step in such a manner as to displace the air of the moulding tube. This method of operation simplifies the ultimate filling of the container and obviates the air purging operation. One can go further in this way and fill the container on the machine immediately after the blowing. In this case it is preferable to lower the temperature of the product with which the container is being filled in order to avoid the premature establishment of the pressure of utlisation when the neck of the container has not yet been cooled and consolidated. Advantageously the temperature will be such that the vapour pressure above the filling liquid is equal to atmospheric pressure. Thus one cools the container to the point at which it just reaches the required rigidity at the same time avoiding an objectionable overheating of the mould.

It is well known that these different arrangements can be used together or separately according to the type of container produced.

According to another aspect of the invention there is provided a valve for a container of fluid under pressure such valve comprising a body and a cap traversed by at least one passage and extending from the interior to the exterior face of the body, a means for fixing a dip tube to the body to be in communication with the passage, an enlargement of the passage containing a spring, a further and greater enlargement adjacent the first and enclosing an annular seal and a narrower tubular portion of slightly larger diameter than that of the valve head; a blind tube furnished in the vicinity of its closed extremity with a collar or flange forming the valve head and adapted to be pressed into the body of the valve furnished with all the other members, the valve head fitting between the spring and the seal, the wall of the tube being pierced by a lateral passage in the vicinity of the valve head between the latter and the open extremity of the blind tube at a distance such that depression of the tube brings this lateral passage into the spring chamber.

Reference is made to the accompanying drawings in which:

FIGURE 1 shows schematically a longitudinal section of a first embodiment of container according to the invention;

FIGURE 2 shows an enlarged sectional view of part of the valve of the container shown in FIGURE 1;

FIGURE 3 shows an enlarged sectional view of a further part of the valve of the container shown in FIGURE 1;

FIGURE 4 shows a variant of the part of FIGURE 3;

FIGURE 5 shows, in section, another form of valve for use with the container of this invention;

FIGURE 6 shows, in section, a further form of valve;

FIGURE 7 shows the valve of FIGURE 6 operated in a different manner;

FIGURE 8 is a fragmentary view of a portion of the valve of FIGURES 6 and 7;

FIGURE 9 is a sectional view of yet another form of valve for the container of this invention;

FIGURE 10 shows a second form of container according to the invention;

FIGURE 11 shows a portion of the container of FIGURE 10;

FIGURE 12 shows a portion of the valve used with the container of FIGURE 10;

FIGURE 13 shows one form of cap for use with the container of FIGURE 10;

FIGURE 14 is a section on the line A—B of FIGURE 15;

FIGURE 15 is an elevational view of a second form of cap for use with the container of FIGURE 10;

FIGURE 16 is a sectional view of a third form of such cap; and

FIGURES 17 and 18 are sectional elevations of two further forms of container according to this invention.

The manufacture of an aerosol container 1 of 150 cc. capacity in high density polythene is illustrated in FIGURE 1.

In a preliminary operation one assembles a valve body comprising; an annular base 2 in high density polythene provided with a spigot 2a carrying a dipping tube 3. The base 2 has a series of peripheral ribs and a substantially cylindrical central well for a stainless steel spring 5 operating at a compressive force of 800 gm. This well connects with a channel of much smaller diameter and opening at the extremity of the spigot.

The dipping tube 3 of low density polythene is engaged forcibly over the spigot 2a and is secured by the annular ridge which the latter carries.

An annular cap 7 of high density polythene is secured to the base 2 and like the latter is furnished with peripheral ribs. The channel of cap 7 has an enlargement adapted to receive a seal 4 of suitable material.

The base and the cap furnished with their accessories are assembled and joined together, the portion 2b increasing the rigidity of the assembly.

The body of the valve is then heated in an oven to a 100° C. and fitted on the blowing nozzle of a blow moulding machine, the mould being open.

A polythene tube (of diameters 28 and 35 mm.) is extruded over this assembly and the mould is closed when the tube reaches the bottom thereof. The blowing is then immediately started by a set of relays.

The hot and softened plastic of the tube fills the free space of the mould and, at the same time, fills the grooves provided in the peripheries of the members 2 and 7.

It should be noted that the neck 1a of the container just made is thus tightly welded to the body of the valve. Moreover, shrinkage of the neck on cooling closes the assembly to form a perfect seal.

Despite the proximity of hot members it can be seen that neither the dipping tube 3 nor the seal 4 are affected.

The nozzle 6 of the valve can be fitted either before or after filling of the container; in the second case it is preferably inserted by a mechanism mounted on the nose of the filling apparatus.

As can be seen from FIGURES 2, 3 and 4, this nozzle is constituted by a tube of nylon 66 provided with a blind bore 6c tapered in the vicinity of its closed end and carrying at this level a circular valve 6a. Behind the valve the wall of the tube is pierced by a channel 6b.

The respective diameters of the valve 6a, of the channel of the cap 7, of the orifice for the seal 4 and of the spring chamber of the body 2 are such that the nozzle can be pushed down until the valve clears the seal but cannot then be withdrawn under normal conditions. This disposition of parts is clearly shown in FIGURES 2 and 3 which represent the valve and its nozzle on an enlarged scale.

When the container is filled and furnished with its nozzle it is only necessary to cap the latter with button 8 which serves at the same time as an operating member and a diffuser.

The functioning of the valve is as follows:

When one depresses the operating member, the valve 6a is lowered and disengages from the bottom of the seal 4. Simultaneously the enlarged part of the tube 6 engages on the upper border of the orifice of the seal. The seal bends and the lower edge of this orifice enlarges and thus uncovers the passage 6b, when the upper edge of this orifice tightens again around the nozzle and prevents any escape. When one releases the pressure on the push-button, the spring 5 forces the valve once again against the bottom of the seal.

If desired one can furnish the container with an added base 10 which gives it a greater stability and with a cap 9 which protects the operating mechanisms.

The construction of such a container can naturally take a number of various forms without departing from the scope of the invention. Thus the body of the container can be made from a simple tube or comprise many layers or parts of plastic materials possessing complementary properties; it is necessary in the latter case to form a composite tube by means of extruders having concentric heads supplied with the appropriate materials, the tube obtained then being blown under the same conditions as a simple tube.

Similarly the nozzle can be moulded in a plastics material with the valve integral as illustrated in FIGURE 3 or be formed of metal and have a separate flexible valve inserted as illustrated in FIGURE 4. One could also injection mould in one piece the assembly designated by the parts 2 and 3 in FIGURE 1, that is to say the body of the valve and the dip tube.

The following examples show other distributor valves adapted for containers according to the invention.

FIGURE 5 shows a dosing valve of variable capacity which allows, by the substitution of a single member, modification of the amount dosed by a single model of the valve.

In this valve the nozzle 6 is extended beyond its valve 6a by a portion 6d terminating in conical surface 6e. When one depresses the nozzle to introduce the passage 6b into the spring chamber 2c the conical surface 6e closes the flexible projections 2d moulded around the lower opening of the chamber 2c, thus closing passage 6b. Conversely, when one releases the nozzle the spring 5 forces the nozzle 6 upwardly until the passage 6b leaves the chamber 2c while the conical surface 6e uncovers the lower orifice of the latter.

If desired the cone 6e can be provided with a blind bore 6f communicating at its open end with the passage of the dip tube and at its closed extremity by means of orifice 6g with the chamber 2c. The orifice 6g is closed by the projection 2d when the nozzle is depressed. It opens out into the chamber when the nozzle is released. The access of the fluid to the chamber 2c is thereby facilitated. The member 2 is moulded with a chamber 2c of the maximum desired capacity. A ring 14 is fitted over this and engaged by the cap 7 to maintain the seal 4. The volume of the chamber is modified as desired by insertion of a reducing sleeve 15. This sleeve can be independent or constitute an integral extension of the ring 14. Because of the method of mounting the valve it is useful to maintain the spring 5 in its correct position. When the walls of the chamber 2c are very far away this may be ensured by providing the base of the chamber by teeth or an annulus 2e.

FIGURES 6 to 8 represent another form of valve functioning either as a dosing valve or as a continuous discharge valve.

FIGURE 6 illustrates the position of continuous discharge; a protuberance 7a of the cap 7 stopping the movement of the diffuser 8 before the tail of the nozzle has closed the lower orifice of the chamber 2c. Since the orifice 6b of the nozzle is disengaged a fluid under pressure passes directly to the diffuser.

The protuberance 7a shown in section on the line A—A by FIGURE 8 is formed by two opposed circular sectors, each less than 90°. The base of the diffuser carries identical protuberances. If one turns the container 90° relatively to the diffuser (FIGURE 7) each protuberance 7a can engage between the corresponding projections of the diffuser so that this can execute an increased movement. Then the tail of the nozzle can close the lower orifice of the chamber 2 so that only the dose of fluid initially present in the chamber can escape.

It is clear that one can use the same principle to block the diffuser in its closed position thereby guaranteeing security against accidental operation; it is only necessary to modify the height, and if one desires the number, of projections 7a.

FIGURE 9 represents a dosing valve of the "free-hands" type, that is to say capable of dispensing a dosed quantity without any additional operation other than the starting action.

As in the dosing valves previously described the body of the valve contains a cavity of specified volume variable by the addition of a reducing sleeve. In the present case this cavity does not open directly at the bottom of the body of the valve but it is closed by a second elastic seal 16 held in position by a ring 17 and traversed by the extremity of the nozzle. It is on the lower face of this seal 16 that the valve is pressed.

A reduced chamber 2f arranged in the body of the valve under this seal permits the backing of the valve into the chamber which also houses the compression spring.

The movement of the nozzle can be limited by the complete compression of the spring. One could equally well furnish the nozzle with an abutment which engages on the upper face of the seal 4.

The position of passage 6b is such that in an upper position it opens into the chamber 2c but in a lower position it is closed by the seal 16.

The filling of the chamber 2c takes place when one depresses the nozzle; a groove 6h of length greater than the thickness of the seal 16, formed in the exterior wall of the nozzle at the level of the passage 6b but a different point of the circumference, then puts chambers 2c and 2f into communication and a definite quantity of fluid enters chamber 2c. When one frees the nozzle it rises under the pressure of the spring and the base of the groove rises to above the base of the seal and the passage 6b brings the tube of the nozzle in communication with the chamber 2c.

The groove 6h can be formed by moulding, milling or pressing so that it has any dimensions compatible with a good functioning of the valve. When it takes up a considerable portion of the cylindrical surface of the nozzle it is clear that one must ensure the constant centering of the nozzle in the seal by ribs or any other guide. Without such a guide the passage 6b in the lower position will not lie against the seal 16 and the nozzle will discharge compressed fluid during the refilling of the dosing chamber.

With an appropriate disposition of the passage 6b or of the groove 6h one can equally well effect the two positions of functioning by adjusting the thrust of the nozzle as shown in FIGURES 6 to 8.

FIGURE 10 represents a container having two compartments equipped with two independent distribution nozzles. This container differs from that described with reference to FIGURE 1 only by the presence of the partition 11 and the number of valves carried by the member 2.

The partition 11 is shown on an enlarged scale in FIGURE 11. This is a generally circular member, having towards the material constituting the body of the container the same properties of adherence and sealing as the member 2. It carries advantageously the same ribs at its periphery. This partition comprises a channel 11a permitting the connection of the lower compartment to the valve through the intermediary of the dip tube. This tube can simply be forced through the passage, its elasticity ensuring the sealing between the two compartments. One could equally cause the passage to debouch at the tips of two spigots 11b and 11c similar to the spigot 2a of the member 2 and replace the single dipping tube by two short tubes, one, referenced 12, connecting 2a to 11b and the other, reference 13, simply extending the spigot 11c. As a further modification one at least of the spigots 11b or 11c could be given a sufficiently long form to avoid the use of tube 12 or 13. The spigot 11d permits the fixation of the lower extremity to the dip tube 3 which, like the tube 12, rigidifies the members 2 and 11 during the first stage of manufacture of the container. This spigot 11d has a channel represented in the drawings as having the form of a crossed slot, allowing fluid to penetrate to the base of the dip tube. It is clear that this spigot would be useless with a tube 12 so rigid as to avoid all movement of the member 11 during the manufacture of the container.

FIGURE 12 shows on a much enlarged scale the upper partition preassembled with seals and springs of two valves. In FIGURE 10 the valves are shown equipped each with an independent operating button, FIGURES 13 to 16 show different operating buttons acting simultaneously on the two valves.

FIGURE 13 shows in section a device particularly appropriate to the atomisation of a viscous liquid (coming through the left hand pipe) under the effect of a high speed fluid (coming along the right hand pipe). Advantageously, in this case, the compartment of operating fluid will be under a pressure higher than that of the viscous liquid.

FIGURES 14 and 15 illustrate respectively in horizontal section along the line A–B and in plan a device useful when the discharge mixture produces a solid body which tends, after the first use, to block the diffuser shown in FIGURE 13 (for example atomisation of an alkaline-bicarbonate and of aluminium-sulphate under pressure of $CO_2$ or of volatile fluorocarbon, in the case of a foam fire extinguisher).

FIGURE 16 shows a modification of a device of FIGURE 13 permitting particularly the production in emulsion spray of two stable and chemically compatible liquids.

The figures do not show the flow regulating diaphragms which can be inserted in the different circuits.

It will be appreciated that the invention also concerns containers having more than two compartments and the number of these is only limited by over-crowding of the top closure by the different distributing valves.

As is shown in FIGURES 1 to 10 the base of the container according to the invention is generally convex in order that it may better resist the internal pressure. These containers cannot therefore be stood vertically unless one uses an attaching base 10.

FIGURE 17 shows in course of manufacture a container having an integral base stand.

This container differs from that which has been shown in FIGURE 10 by the form of the lower chamber and by the fact that the partition 11 is non-perforated. One can obtain this according to techniques already indicated that is to say by blowing of the two chamber by means of two independent blow nozzles or by vacuum moulding, the mould of the lower chamber being or not furnished with an air entry nozzle at the level of the closure jaws.

In operating under vacuum and without the entry of air it is preferable that the lower chamber should have a lenticular form as shown in the figure; when one cuts off the vacuum to the mould the cap 1c is aspirated by the depression which exists in the interior of the chamber and folds back against the base 1b as shown in dotted lines. One thereby obtains a concave base stand.

When operating by blowing or by aspiration with re-entry of air there is no depression in the lower chamber and it is possible to give to the base stand a flat or concave form in the mould itself.

FIGURE 18 illustrates another embodiment of container having an integral base stand; one first forms a container having two chambers as described in the preceding examples, the cap 1c having a form which makes it suitable for use as a valve protecting cover on the top of the container (as shown in dotted lines).

After solidifying of the plastics material one cuts the lower chamber along the line A—A advantageously marked by the groove 1d; one thereby obtains a stable base stand 1b and a cap 1c which itself is useful. One thereby replaces the special manufacture of two pieces 9 and 10 by the manufacture of a single piece 11.

We claim:
1. A thermoplastic container for fluids under pressure comprising a single piece body having a discharge aperture, said body having walls defining at least one chamber therein, an inner surface to said walls, a distributor valve structure having on the lateral surface thereof ribs defining grooves therebetween, said distributor valve structure being positioned wholly within said container, inwardly projecting ribs on said inner surface of the walls of said container defining grooves therebetween, said ribs and grooves on said distributor valve structure co-operating with said grooves and ribs on the inner surface of the walls of said container body to define a sealing-tight connection between said body and said distributor valve structure, the latter being held in place in the body solely by the co-operation of said ribs and grooves after they have been joined by coalescence, said valve structure including sealing means for said aperture, a valve in said aperture extending through said sealing means and cooperating therewith to normally prevent the flow of fluid from said container but permitting filling of said container through said valve structure.

2. A thermoplastic container for fluids under pressure as defined in claim 1 further comprising at least one member forming at least one transverse partition in said body to define at least two chambers in said container, ribs on the lateral surface of said member defining therebetween grooves, ribs on the inner surface of said body wall defining therebetween grooves, said ribs and grooves co-operating to form a sealing-tight connection between said member and said body after they have been welded together and forming the sole means of support of said member in said body.

3. A thermoplastic container for fluids under pressure as defined in claim 2, further including a supplementary distributor valve structure, said member having passage means therethrough, tube means connecting said passage means to said supplementary distributor valve structure.

4. A thermoplastic container for fluids under pressure as defined in claim 3 in which said supplementary distributor valve structure is formed integrally with the first distributor valve structure, each distributor valve structure being in fluid communication with a different one of said chambers, said first and supplementary distributor valve structures being operated by a single element.

5. A thermoplastic container for fluids under pressure as defined in claim 1 wherein the bottom of the container is formed with a stabilizing base.

References Cited by the Examiner

UNITED STATES PATENTS

| | | | |
|---|---|---|---|
| 218,698 | 8/1879 | Beardsley | 215—78 |
| 772,117 | 10/1904 | Winslow | 264—271 |
| 1,639,699 | 8/1927 | Hopkins | 222—94 |
| 2,510,269 | 6/1950 | Winter. | |
| 2,696,337 | 12/1954 | Dinhofer. | |
| 2,776,453 | 1/1957 | Kish | 264—271 |
| 2,799,435 | 7/1957 | Abplanalp | 222—394 |
| 2,872,760 | 2/1959 | Meissner | 264—88 X |
| 2,874,881 | 2/1959 | Stull. | |
| 2,925,938 | 2/1960 | Parsons | 222—94 |
| 2,947,035 | 8/1960 | Baker | 264—271 |
| 2,947,449 | 8/1960 | Hernandez | 222—94 |
| 2,973,883 | 3/1961 | Modderno | 222—94 |
| 2,991,044 | 7/1961 | Briechle | 251—353 |
| 3,026,576 | 3/1962 | Henderson | 264—271 X |
| 3,031,104 | 3/1962 | Moskovitz | 222—94 |
| 3,037,070 | 5/1962 | Sussman et al. | 264—271 X |
| 3,081,917 | 3/1963 | Quercia | 222—394 |
| 3,109,625 | 11/1963 | Steiman et al. | 251—353 |
| 3,143,250 | 8/1964 | Pengue | 222—394 X |
| 3,154,222 | 10/1964 | Heckman | 222—215 X |
| 3,156,383 | 11/1964 | Melli | 222—215 X |
| 3,157,314 | 11/1964 | Nadler | 222—215 X |
| 3,161,330 | 12/1964 | Sagarin et al. | 222—394 X |

FOREIGN PATENTS

| | | |
|---|---|---|
| 1,194,379 | 5/1959 | France. |
| 1,292,114 | 3/1962 | France. |
| 615,347 | 1/1949 | Great Britain. |

OTHER REFERENCES

British Plastic, vol. 26, No. 293, pp. 357–360, October 1953.

RAPHAEL M. LUPO, *Primary Examiner.*